US010911416B2

(12) United States Patent
Eldridge

(10) Patent No.: US 10,911,416 B2
(45) Date of Patent: *Feb. 2, 2021

(54) SECURED TRANSFER OF DATA BETWEEN DATACENTERS

(71) Applicant: salesforce.com, inc., San Francisco, CA (US)

(72) Inventor: Paul Eldridge, Fairfax, VA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,642

(22) Filed: Aug. 2, 2019

(65) Prior Publication Data

US 2020/0028830 A1 Jan. 23, 2020

Related U.S. Application Data

(63) Continuation of application No. 15/419,303, filed on Jan. 30, 2017, now Pat. No. 10,375,034.

(51) Int. Cl.
*H04L 29/06* (2006.01)
*G06F 21/60* (2013.01)
*G06F 11/30* (2006.01)
*G06F 11/34* (2006.01)

(52) U.S. Cl.
CPC ...... *H04L 63/0428* (2013.01); *G06F 11/3006* (2013.01); *G06F 11/3409* (2013.01); *G06F 11/3442* (2013.01); *G06F 21/602* (2013.01); *H04L 63/0272* (2013.01);
(Continued)

(58) Field of Classification Search
None
See application file for complete search history.

(56) References Cited

U.S. PATENT DOCUMENTS 7,111,162 B1* 9/2006 Bagepalli ............ H04L 63/0428
709/227
7,219,223 B1* 5/2007 Bacchus ............. H04L 63/0428
713/150
(Continued)

OTHER PUBLICATIONS

Exa-Networks / exabgp, GitHub—Exa-Networks/exabgp: The BGP swiss army knife of networking, https://github.com/Exa-Networks/exabgp, 2017, 4 pages. [Retrieved Jan. 30, 2017].

(Continued)

*Primary Examiner* — Shin-Hon (Eric) Chen
(74) *Attorney, Agent, or Firm* — Kowert, Hood, Munyon, Rankin & Goetzel, P.C.

(57) ABSTRACT

In various embodiments, a method of transferring data between datacenters may be performed. The method may include running a first plurality of host programs and a first plurality of encryption units at a first datacenter. The method may further include establishing, between the first datacenter and a second datacenter, secure communication connections between each of the first plurality of encryption units and a corresponding one of a second plurality of encryption units running at the second datacenter. The method may further include transferring, by the first datacenter, data from the first plurality of host programs to a second plurality of host programs running at the second datacenter.

14 Claims, 11 Drawing Sheets

(52) U.S. Cl.
CPC ...... *H04L 63/0435* (2013.01); *H04L 63/0485* (2013.01); *G06F 2201/81* (2013.01); *G06F 2221/2107* (2013.01)

(56) References Cited

U.S. PATENT DOCUMENTS

| | | | | |
|---|---|---|---|---|
| 8,078,903 | B1* | 12/2011 | Parthasarathy | H04L 67/1097 714/4.11 |
| 8,533,808 | B2* | 9/2013 | Raz | H04L 29/12481 726/12 |
| 8,959,329 | B2* | 2/2015 | Altman | H04L 63/1416 713/150 |
| 2005/0114480 | A1* | 5/2005 | Ramamoorthy | H04L 67/1002 709/220 |
| 2006/0095969 | A1* | 5/2006 | Portolani | H04L 67/1002 726/23 |
| 2010/0217971 | A1* | 8/2010 | Radhakrishnan | H04L 69/22 713/153 |
| 2012/0221745 | A1* | 8/2012 | Murthy | G06F 3/0635 709/250 |
| 2015/0156174 | A1* | 6/2015 | Fahey | H04L 63/0428 713/168 |
| 2015/0156203 | A1* | 6/2015 | Giura | H04L 67/02 726/4 |
| 2016/0072704 | A1* | 3/2016 | Angel | G06F 9/5072 709/226 |
| 2017/0046520 | A1* | 2/2017 | Ohrimenko | G06F 21/602 |
| 2017/0214738 | A1* | 7/2017 | Agarwal | H04L 47/125 |
| 2018/0167450 | A1* | 6/2018 | Cherukuri | H04L 67/1036 |

OTHER PUBLICATIONS

Amazon Web Services, Inc., Example: Generic Customer Gateway Using Border Gateway Protocol—Amazon Virtual Private Cloud, https://docs.aws.amazon.com/AmazonVPC/latest/NetworkAdminGuide/GenericConfig.html, 2017, 9 pages. [Retrieved Jan. 30, 2017].
Vincent Bernat, "High availability with ExaBGP," Sep. 6, 2013, https://vincent.bernat.im/en/blog/2013-exabgp-highavailability, 16 pages. [Retrieved Jan. 30, 2017].
VPP/IPSec and IKEv2, from fd.io <VPP, https://wiki.fd.io/view/VPP/IPSec_and_IKEv2, 14 pages. [Retrieved Jan. 30, 2017].
Welcome to Openswan!, https://www.openswan.org/, 2016, 1 page. [Retrieved Jan. 30, 2017].
Quagga Software Routing Suite, Quagga Routing Software Suite, GPL licensed, http://www.nongnu.org/quagga/, 2 pages. [Retrieved Jan. 30, 2017].
C. Kaufman, et al., Standards Track, RFC 7296—Internet Key Exchange Protocol Version 2 (IKEv2), Oct. 2014, https://tools.ietf.org/html/rfc7296, 143 pages. [Retrieved Jan. 30, 2017].
Stop Buying Load Balancers and Start Controlling Your Traffic Flow with Software—Shutterstock Tech, https://tech.shutterstock.com/2014/05/22/stop-buying-load-balancers-and-start-controlling-your-traffic-flow-with-software/, 2017, 4 pages. [Retrieved Jan. 30, 2017].
cz.nic,, The BIRD Internet Routing Daemon Project, http://bird.network.cz/?get_doc&f=bird.html, 1 page. [Retrieved Jan. 30, 2017].
VPP/What is VPP?, from fd.io <VPP, https://wiki.fd.io/view/VPP/What_is_VPP%3F, Nov. 13, 2016, 8 pages. [Retrieved Jan. 30, 2017].

\* cited by examiner

950

```
┌─────────────────────────────────────────────────────────────┐
│ Establishing secure communication connections between each  │
│ of a first plurality of encryption units at a first         │
│ datacenter and a corresponding one of a second plurality    │
│ of encryption units at a second datacenter                  │
│                            952                              │
└─────────────────────────────────────────────────────────────┘
                              │
                              ▼
┌─────────────────────────────────────────────────────────────┐
│ Providing, to a first plurality of host programs at the     │
│ first datacenter, information indicative of one or more     │
│ performance metrics of the first plurality of encryption    │
│                           units                             │
│                            954                              │
└─────────────────────────────────────────────────────────────┘
                              │
                              ▼
┌─────────────────────────────────────────────────────────────┐
│ Transferring data from a first host program of the first    │
│ plurality of host programs to a second host program of a    │
│ second plurality of host programs at the second datacenter, │
│ wherein the transferring includes:                          │
│                            956                              │
└─────────────────────────────────────────────────────────────┘
                              │
                              ▼
┌─────────────────────────────────────────────────────────────┐
│ Receiving, at a first encryption unit of the first          │
│ plurality of encryption units, data from the first host     │
│ program, wherein the receiving is in response to the first  │
│ host program selecting the first encryption unit to encrypt │
│ the data based on the information indicative of one or more │
│ performance metrics of the first encryption unit            │
│                           956A                              │
└─────────────────────────────────────────────────────────────┘
                              │
                              ▼
┌─────────────────────────────────────────────────────────────┐
│ Encrypting, by the first encryption unit, the data to       │
│ generate encrypted data                                     │
│                           956B                              │
└─────────────────────────────────────────────────────────────┘
                              │
                              ▼
┌─────────────────────────────────────────────────────────────┐
│ Sending, via a first secure communication connection of the │
│ secure communication connections, the encrypted data to a   │
│ corresponding second encryption unit at the second          │
│ datacenter                                                  │
│                           956C                              │
└─────────────────────────────────────────────────────────────┘
```

SECURED TRANSFER OF DATA BETWEEN DATACENTERS

RELATED APPLICATIONS

The present application is a continuation of U.S. application Ser. No. 15/419,303, filed Jan. 30, 2017 (now U.S. Pat. No. 10,375,034), the disclosure of which is incorporated by reference herein in its entirety

BACKGROUND

Technical Field

This disclosure relates generally to the operation of a datacenter, and more specifically to transferring data between datacenters.

Description of the Related Art

Datacenters may be used to provide computing resources for a variety of entities. For example, a business may use one or more datacenters to host web applications or store data, which may include personal or confidential information. In some instances, data may need to be transferred between datacenters, for example as part of a data backup or restore operation. In such instances, the data may be transferred over unencrypted communication links, leaving the personal or confidential information susceptible to interception by unauthorized third-parties. In various situations, it may be desirable to encrypt data that is transferred between datacenters.

BRIEF DESCRIPTION OF THE DRAWINGS

FIG. 9B is a flow diagram illustrating an additional example method for transferring encrypted data between datacenters, according to some embodiments.

DETAILED DESCRIPTION

This disclosure describes, with reference to FIGS. 1-9, example systems and methods for securely transferring data between datacenter sites, according to various embodiments. Finally, an example computer system is described with reference to FIG. 10.

Figure 1:
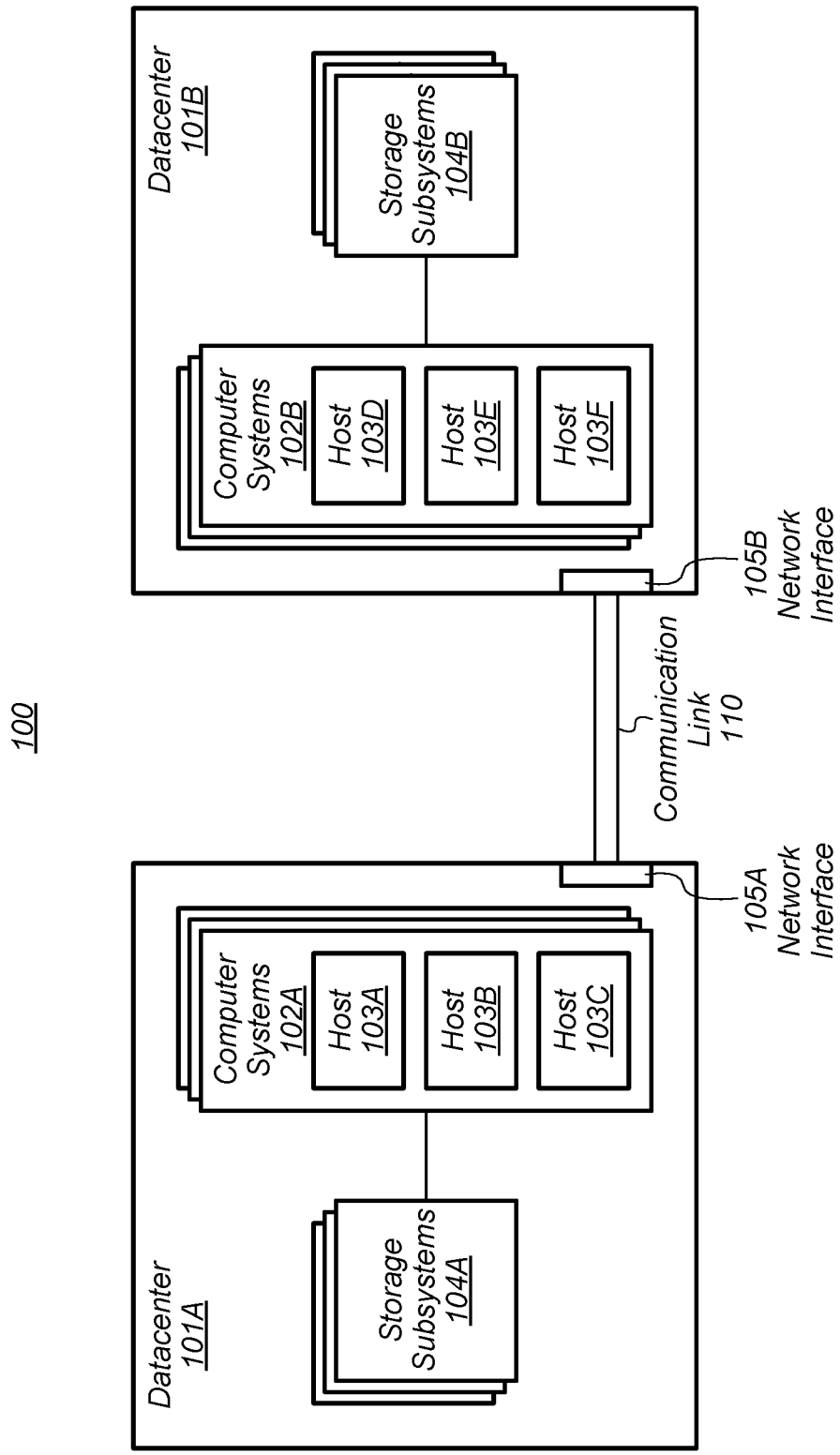
FIG. 1 is a block diagram illustrating an example datacenter system, according to some embodiments.

Referring now to FIG. 1, a block diagram illustrating an example datacenter system 100 is shown. In the illustrated embodiment, system 100 includes datacenters 101A and 101B (referred to collectively as datacenters 101) connected by communication link 110. As used herein, the term "datacenter" is intended to have its ordinary and accepted meaning in the art, including a facility comprising a plurality of computer systems and a plurality of storage subsystems configured to store data for a plurality of entities. In various embodiments, a datacenter may include either a physical datacenter or a datacenter implemented as part of an Infrastructure as a Service (IaaS) environment. Note that, although only two datacenters are shown in system 100, this depicted embodiment is shown for clarity and is not intended to limit the scope of the present disclosure. In other embodiments, for example, system 100 may include three, four, or any other suitable number of datacenters 101. As shown in FIG. 1, each of datacenters 101 may include various components and subsystems. For example, in the illustrated embodiment, datacenters 101 include computer systems 102, storage subsystems 104, and network interfaces 105.

In various embodiments, computer systems 102 may include a plurality of computer systems operable to run one or more host programs. For example, as shown in FIG. 1, computer systems 102 may be operable to run a plurality of host programs 103A-103F. Note that, although host programs 103A-103C and 103D-103F are shown in FIG. 1 as running on the same computer system, this depicted embodiment is shown merely for clarity and is not intended to narrow the scope of this disclosure. Indeed, in various embodiments, host programs 103 may be implemented on one or more computer systems in datacenters 101. In various embodiments, host programs 103 may include software applications configured to be utilized by a remote client. For example, in some embodiments, hosts 103 may be cloud-based software applications run on computer systems 102 by various entities for use by remote clients (not shown) as part of a software as a service (SaaS) model.

Datacenters 101 may also include storage subsystems 104 coupled to computer systems 102. In various embodiments, storage subsystems 104 may be operable to store data for a plurality of entities. For example, in some embodiments, storage subsystems 104 may be operable to store data for one or more of the entities that operate host programs 103 on computer systems 102. Further, datacenters 101 may include network interfaces 105, which may be coupled to one or more communication links. For example, in some embodiments, network interfaces 105 may be coupled to communication link 110. In some embodiments, communication link 110 may include any number of high-speed communication links. In one embodiment, for example, communication link 110 may include a "bundle" of fiber optic cables capable of transmitting data on the order of hundreds of gigabits per second (Gbit/s) to terabits per second (Tbit/s).

In various embodiments, datacenters 101A and 101B may be configured to communicate over communication link 110 via network interfaces 105. In some embodiments, various hosts 103A-103C in datacenter 101A may be configured to transfer data to one or more hosts 103D-103F at datacenter 101B, for example as part of a data backup or restore operation. This disclosure refers, for example, to a first datacenter "sending data" or "transferring data" to a second datacenter. This usage refers to actions taken at the first datacenter that are intended to cause the data to be transmitted over a communication link to the second datacenter. References to the first datacenter sending data to the second datacenter is expressly not intended to encompass actions occurring at the second datacenter or within one or more communication devices or networks linking the first and second datacenters. In various embodiments, the data transferred between datacenters 101 may include sensitive or proprietary information, such as the information of one or more entities that utilize computer systems 102. When transferred over communication link 110, however, this data may be susceptible to interception by unauthorized third-parties. For example, in some embodiments, communication link 110 may be unencrypted or otherwise unsecure. In such embodiments, unauthorized third parties may attempt to intercept the data transmitted between datacenters 101, for example by physically splicing into and collecting data transferred via communication link 110. Thus, transferring data across communication link 110 may leave sensitive or proprietary information vulnerable to unauthorized collection.

Various techniques have been developed to attempt to address this concern. One such technique utilizes specialized "hardware encryptors" to encrypt data transferred between datacenters. In some embodiments, a hardware encryptor may include dedicated hardware installed at datacenters 101 through which data transferred between datacenters 101 may be routed. The hardware encryptors may be configured to encrypt data as it is sent out of a datacenter 101A and decrypt the data as it is received at a datacenter 101B. Hardware encryptors, however, have various shortcomings. For example, hardware encryptors may be limited in the rate at which they are capable of processing data. In various embodiments, the bandwidth of a communication link over which encrypted data is to be transferred, such as communication link 110, may far exceed the rate at which a hardware encryptor can encrypt the data to be transferred. Thus, in such embodiments, the data transfer rate between datacenters 101 may be severely limited by the processing capabilities of the hardware encryptors.

To mitigate these processing limitations, one approach may be to implement a large number of hardware encryptors at each datacenter 101. However, the approach also has various drawbacks. For example, hardware encryptors may be expensive to implement due to purchasing costs, licensing fees, operator training, hardware maintenance, etc. Thus, simply implementing a large number of hardware encryptors may be financially infeasible or inefficient, in various embodiments. Further, the demand to transfer data between datacenters may vary over time. In some embodiments, this variation may be characterized by relatively long periods of low demand punctuated with relatively short periods of high demand. In such embodiments, hardware encryptors again present various shortcomings. For instance, in order to have enough capacity to accommodate the periods of high demand, a larger number of hardware encryptors would need to be implemented. As noted above, however, this may be financially expensive. Alternatively, if one were to implement a lower number of hardware encryptors based on the requirements of the periods of low demand, the hardware encryptors would not be able to accommodate the periods of high demand, resulting in a system that is unable to scale based on the demands of the system at a given time.

Another technique to address securely transferring data between datacenters involves establishing individual secured connection between each host program 103 at datacenters 101A-101B. In this configuration (referred to herein as a "full-mesh" configuration), each host program 103 at datacenter 101A attempting to transfer data to a host program 103 at datacenter 101B would be required to establish a secured connection between the two host programs. For example, for host program 103A to transfer data to each of host programs 103D-103F, three separate secured connections would have to be established—one between 103A and 103D, one between 103A and 103E, and one between 103A and 103F. While such a configuration may be acceptable for a relatively small number of host programs 103 or relatively small data transfers, such a full-mesh configuration also has various shortcomings. For example, establishing secured connections between each individual pair of host programs drastically increases the computational requirements to transfer the data between datacenters. This may be problematic, for example, in an IaaS environment, in which computing resources are purchased on a per-use basis. Thus, in such an embodiment, the full-mesh configuration may be both computationally and financially expensive.

Example Systems

Figure 2:
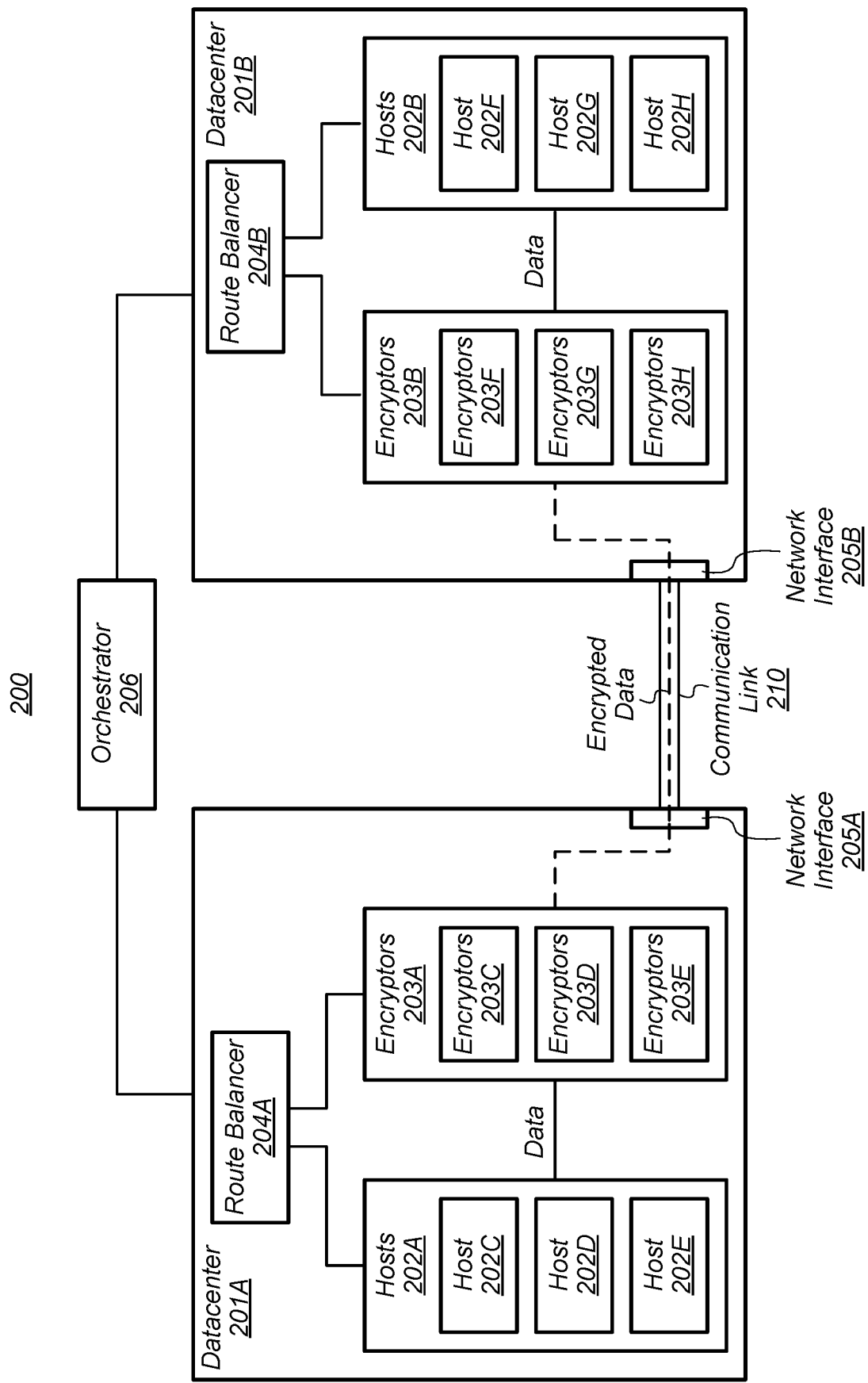
FIG. 2 is a block diagram illustrating an example system operable to transfer data encrypted between datacenters, according to some embodiments.

Turning now to FIG. 2, a block diagram of a datacenter system 200 is shown, according to some embodiments. In various embodiments, system 200 may be operable to communicate encrypted data between datacenters 201A and 201B over communication link 210. For example, system 200 may be operable to transfer encrypted data from various hosts 202C-202E at datacenter 201A to one or more hosts 202F-202H at datacenter 201B over communication link 210.

As shown in FIG. 2, system 200 may include datacenters 201A and 201B (referred to collectively as datacenters 201) coupled together via communication link 210. In various embodiments, datacenters 201 may include hosts 202, encryptors 203, and route balancers 204. In various embodiments, any of hosts 202, encryptors 203, or route balancers 204 may be implemented, for example, as virtual machines (VMs) executing on one or more computer systems, such as computer systems 102 of FIG. 1. Note, however, that this described embodiment is merely provided as a non-limiting example and is not intended to limit the scope of the present disclosure. In other embodiments, for example, any of hosts 202, encryptors 203, or route balancers 204 may be implemented as one or more physical computer system at datacenters 201.

Encryptors 203 (also referred to herein as "encryption units") may be configured to encrypt data that is sent from hosts at one datacenter to hosts at another datacenter, such that the encrypted data may be transferred securely over communication link 210. For example, host 202C in datacenter 201A may attempt to send data to host 202F in datacenter 201B. In such an embodiment, an encryptor 203 at datacenter 201A (e.g., encryptor 203C) may be configured to receive the data from host 202C, encrypt the data to generate encrypted data, and send the encrypted data, via the communication link 210, to a corresponding encryptor 203 at datacenter 201B (e.g., encryptor 203F). Once encryptor 203F receives the encrypted data, encryptor 203F may be configured to decrypt the data and send the decrypted data to the destination host 202F.

System 200 may also include orchestrator 206. In various embodiments, orchestrator 206 may include a plurality of host programs running on one or more computer systems outside of both datacenters 201. In other embodiments, however, orchestrator 206 may be implemented as a host program running on a computer system at either or both of datacenters 201A or 201B. In various embodiments, orchestrator 206 may be configured to communicate with both datacenters 201 and initiate the operation of encryptors 203 and route balancers 204 at both datacenters 201. In some embodiments, encryptors 203 or route balancers 204 may be implemented as VMs running on one or more computer systems at datacenters 201. In such embodiments, orchestrators 206 may be configured to instantiate a plurality of encryptors 203 and a plurality of route balancers 204 at both datacenters 201.

Orchestrator 206 may be configured to monitor and adjust the number of encryptors 203 running at datacenters 201 at a given time. For example, orchestrator 206 may initially instantiate a pool of encryptors 203 that is larger than initially needed in order to provide standby encryptors 203. As the amount of data transferred through encryptors 203 changes, orchestrator 206 may be configured to dynamically adjust the number of encryptors running at datacenters 201. For example, if the level of usage of the encryptors 203 exceeds a particular threshold, orchestrator 206 may instantiate additional encryptors 203 at both datacenters 201. Conversely, if a level of usage of the encryptors 203 falls below a particular threshold, orchestrator 206 may be configured to remove encryptors 203 at both datacenters 201. In such embodiments, orchestrator 206 is operable to automatically scale the number of encryptors 203 in operation at a given time based on the needs of the system 200. In some embodiments, the levels of usage may be compared to various thresholds corresponding to various consideration or factors, such as a level of processor utilization, data-transfer rate, Bidirectional Forwarding Detection (BFD) link status, syslog alarms, etc. Note that these example thresholds above are provided merely as non-limiting examples. One of ordinary skill in the art with the benefit of this disclosure will recognize that other considerations or factors may be used in establishing a particular threshold to obtain a desired level of performance of the described systems and methods.

Once the encryptors 203 have been instantiated at datacenters 201, secure communication connections may be established between encryptors 203A at datacenter 201A and encryptors 203B at datacenter 201B. In various embodiments, the encryptors 203 may establish peer-to-peer connections between pairs of encryptors 203. For example, in an embodiment, encryptor 203C at datacenter 201A and encryptor 203F at datacenter 201B may establish a peer-to-peer connection via communication link 210. Encryptors 203 may establish the peer-to-peer connections using a variety of techniques. For example, in one embodiment, encryptors 203 establish the peer-to-peer connections using one or more routing protocols, such as the Border Gateway Protocol (BGP). Further, encryptors 203 may also establish a secure communication connection according to a variety of techniques. In some embodiments, encryptors 203 may establish secure communication connections by establishing secure tunnels between encryptors 203 at different datacenters. For example, encryptor 203C at datacenter 201A and encryptor 203F at datacenter 201B may establish a secure tunnel over a peer-to-peer connection between encryptors 203C and 203F. In some embodiments, the secure tunnel may be an Internet Protocol Security (IPsec) tunnel established between two encryptors 203. Note, however, that this description is provided as a non-limiting example and is not intended to limit the scope of the present disclosure. In other embodiments, for example, encryptors 203 may establish a secure communication connection using other techniques or networking protocols, such the Transport Layer Security (TLS) protocol, Secure Sockets Layer (SSL) protocol, or any other suitable protocol, standardized or proprietary, operable to establish a secure communication connection between two computer systems.

In a previous example, a secure communication connection is described as being established between encryptors 203C and 203F. In various embodiments, however, encryptors 203 may be operable to establish secure communication connections between any given pair of encryptors. In some embodiments, for example, each of the encryptors 203 may share one or more cryptographic keys that may be used to establish the secure communication connection. For example, in an embodiment in which the encryptors 203 establish secure tunnels over peer-to-peer connections, the one or more shared cryptographic keys may be used to establish the secure tunnel. By sharing the one or more cryptographic keys between each of the encryptors 203, any given encryptor 203 may be able to establish a secure communication connection with any other encryptor 203 over communication link 210.

As noted above, datacenters 201 may also include route balancers 204. In various embodiments, route balancers 204 may be configured to monitor encryptors 203. For example, route balancers 204 may be configured to monitor one or more levels of usage of the encryptors 203, such as a processor utilization, data throughput, or any other suitable consideration. Based on the levels of usage, route balancers 204 may facilitate modifying a number of encryptors 203 running at datacenters 201. For example, in response to a determination that one or more levels of usage of the encryptors 203 exceeds a particular threshold (e.g., a particular level of processor utilization), route balancers 204 may send a request to orchestrator 206 to add additional encryptors 203 at datacenters 201. Similarly, in response to a determination that one or more levels of usage of the encryptors 203 is below a particular threshold, route balancer 204 may send a request to orchestrator 206 to remove one or more encryptors 203 at datacenters 201.

Additionally, route balancers 204 may be configured to monitor the performance of the encryptors 203 and provide hosts 202 with information corresponding to that performance. For example, route balancer 204 may be configured to monitor the performance of encryptors 203, adjust information indicative of that performance, and provide that adjusted performance information to hosts 202. In various embodiments, route balancers 204 may be configured to monitor various performance metrics of the encryptors 203, such as processor utilization, data-transfer rate, BFD link status, syslog alarms, etc. As discussed in more detail below with reference to FIG. 5, in some embodiments, each encryptor 203 may be configured to monitor or collect information relating to its own performance and then send that information to route balancers 204. For example, each encryptor 203 may be configured to collect information relating to its processor utilization, memory utilization, the status of the secure communication connection with an encryptor 203 at another datacenter 201, etc. Route balancers 204 may receive this information from each of the encryptors 203 in the datacenter 201 and monitor the relative performance of the encryptors 203. As discussed in more detail below with reference to FIG. 4, route balancers 204 may be configured to determine ranking information corresponding to the encryptors 203 based on the performance information. This ranking information may indicate, for example, a level of availability or performance of the individual encryptors in the plurality of encryptors 203. In various embodiments, this ranking information can be based on any number of the performance metrics. Further, in some embodiments, the various performance metrics of the encryptors 203 may be weighted in determining the ranking information, placing emphasis on particular performance metrics.

In various embodiments, route balancers 204 may provide the information indicative of the one or more performance metrics, such as the ranking information, to the hosts 202. In turn, hosts 202 may be configured to use this information to select an encryptor 203 to encrypt data that is to be sent to a host 202 at another datacenter 201. After selecting an encryptor 203, a host 202 may send data to that encryptor 203, where it may be encrypted and transferred, via a secure communication connection over communication link 210, to a corresponding encryptor 203 at another datacenter 201. For example, route balancer 204A may receive performance information, such as data-transfer rate, from encryptors 203C-203E. Route balancer 204 may determine ranking information corresponding to encryptors 203C-203E based on that performance information, for example ranking encryptors 203C-203E based on data-transfer rate. Route balancer 204 may then provide this ranking information to hosts 202C-202E. In this example, host 203D at datacenter 201A may need to transfer data to host 202H at datacenter 201B. Using this ranking information, host 203D may select an encryptor 203 with this highest ranking, e.g., the highest data-transfer rate, to encrypt its data and transfer it to datacenter 201B. In the described example, encryptor 203E may have the highest data-transfer rate, and thus the highest ranking. Host 203D may then transfer data to encryptor 203E, which may be configured to encrypt the data and send the encrypted data to a corresponding encryptor 203H at datacenter 201B via a secure communication connection. Encryptor 203H may then decrypt the data and transfer it to its destination, host 202H.

In various embodiments, one or more of the encryptors 203, route balancers 204, or orchestrator 206 may implement various packet-processing techniques in performing the disclosed operations. In some cases, packets may be processed in a scalar fashion, where a single packet is processed at a time. Alternatively, multiple packets may be processed at a single time, in a procedure referred to as vector or parallel processing. For example, in some embodiments, encryptors 203 and/or route balancers 204 may utilize a parallel packet-processing algorithm in performing the described actions. For example, encryptors 203 may use a parallel packet-processing algorithm to establish the secure communication connections or encrypt the data transferred by the hosts 202. Additionally, encryptors 203 and/or route balancers 204 may utilize a parallel packet-processing technique in determining route information, discussed in more detail below with reference to FIGS. 4 and 5.

In some embodiments, encryptors 203 or route balancers 204 may perform various processing operations using the Vector Packet Processing (VPP) networking library, which is one example of a vector or parallel—as opposed to scalar—processing model that may be implemented in various embodiments. Utilizing a vector or parallel packet-processing model may allow encryptors 203 or route balancers 204 to process data more efficiently than through use of a scalar packet-processing model. For example, in scalar packet-processing, processing a plurality of packets may require a recursive interrupt cycle to be completed for each of the plurality of packets. Using vector or parallel packet-processing, however, may allow groups of similar packets to be processed together, rather than requiring an interrupt cycle to be completed for each packet of the group.

Figure 3:
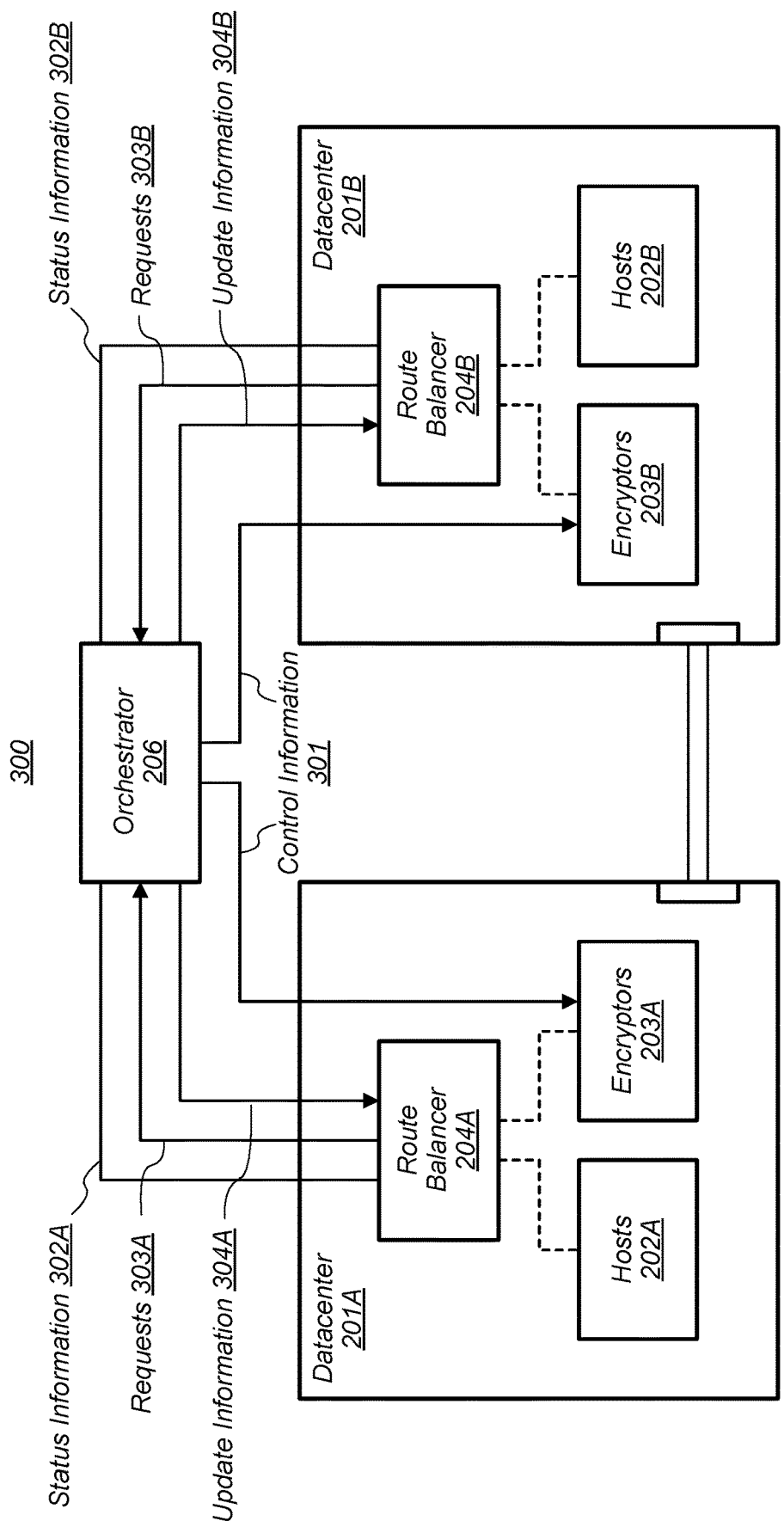
FIG. 3 is a block diagram illustrating an example configuration of an orchestrator, according to some embodiments.

Referring now to FIG. 3, a block diagram of an orchestration system 300 is shown, according to some embodiments. As shown in FIG. 3, orchestration system 300 may include datacenters 201 and orchestrator 206.

As noted above, in various embodiments, orchestrator 206 may be in communication with both datacenters 201 and may be configured to initiate the operation of encryptors 203 and route balancers 204 at both datacenters 201. For example, orchestrator 203 may send a request, such as control information 301, to datacenters 201, to initiate operation of one or more route balancers 204 and a plurality of encryptors 203 at the datacenters 201. In an embodiment in which route balancers 204 or encryptors 203 are implemented as VMs, control information 301 may include one or more calls, such as application programming interface (API) calls, to instantiate the route balancers 204 and encryptors 203. In some embodiments, orchestrator 206 may initiate operation of a pool of encryptors 203, which may include "standby" encryptors 203 to absorb rapid increases in usage. In some embodiments, orchestrator 206 may further be configured to periodically (e.g., every twenty-four hours) removing one or more of encryptors 203 from each of datacenters 201 and replacing them with one or more newly-initiated encryptors 203. In such embodiments, this may prevent various performance issues regarding the encryptors 203 by ensuring that the plurality of encryptors 203 is periodically "refreshed."

Additionally, control information 301 may include a request for encryptors 203 to establish secure communication connections between datacenters 201 via communication link 210. In various embodiments, orchestrator 206 may instruct encryptors 203 at different datacenters 201 to establish peer-to-peer connections. For example, in some embodiments, control information 301 may include information regarding pairing between encryptors 203 at different datacenters 201, such that each encryptor 203A at datacenter 201A has information (e.g., IP address information, hostname information, etc.) about a corresponding encryptor 203B at datacenter 201B. In one embodiment, this peer-to-peer connection may include a BGP peered connection between encryptors 203. In various embodiments, encryptors 203 may establish secure communication connections over these peer-to-peer connections.

Orchestrator 206 may be configured to monitor the performance of route balancers 204. For example, orchestrator 206 may be configured to monitor and collect status information 302 relating to one or more performance metrics of route balancers 204, in various embodiments. Orchestrator 206 may be configured to use status information 302 and determine whether route balancers 204 at either datacenter 201 are performing properly, and if any route balancers 204 need to be added or removed. If orchestrator 206 determines that route balancers 204 need to be added to or removed from either of datacenters 201, orchestrator 206 may send a request, such as control information 301, to initiate operation of more route balancers 204 or to decommission under-performing route balancers 204.

Orchestrator 206 may further be configured to monitor and adjust the number of encryptors 203 running at a datacenter 201 at a given time. As noted above, route balancers 204 may be configured to monitor one or more levels of usage (e.g., processor utilization, data-transfer rate, etc.) of the encryptors 203. Based on these levels of usage, route balancers 204 may determine whether encryptors 203 need to be added or removed from datacenters 201 and, if so, send a request 303 to orchestrator 206 to add or remove encryptors 203. For example, route balancer 204 may determine that one or more levels of usage (e.g., processor utilization) of one or more of the encryptors 203 exceeds a particular threshold. Based on this determination, route balancer 204 may send a request 303 to orchestrator 206 to initiate operation of more encryptors 203 at the datacenters 201. In response to request 303, orchestrator 206 may then communicate control information 301 to datacenters 201, requesting (e.g., via an API call) that additional encryptors 203 be instantiated. Alternatively, route balancer 204 may determine that one or more levels of usage (e.g., processor utilization) is below a particular threshold. Based on that determination, route balancer 204 may send a request 303 to orchestrator 206 to remove from operation one or more encryptors 203 at the datacenters 201. In response to this request 303, orchestrator 206 may then communicate control information 301 to datacenters 201, requesting that one or more of the encryptors 203 be removed from operation. In various embodiments, orchestrator 206 may be configured to send update information 304 to datacenters 201, indicating that encryptors 203 or route balancers 204 have been added or removed.

In various embodiments, the orchestration system 300 may facilitate the elastic auto-scaling of the number of encryptors 203 or route balancers 204 running at datacenters 201. This feature may, for example, enable orchestrator 206 to adjust the number of encryptors 203 running at datacenters 201 at a given time based on a level of usage or need to transfer data between datacenters.

Figure 4:
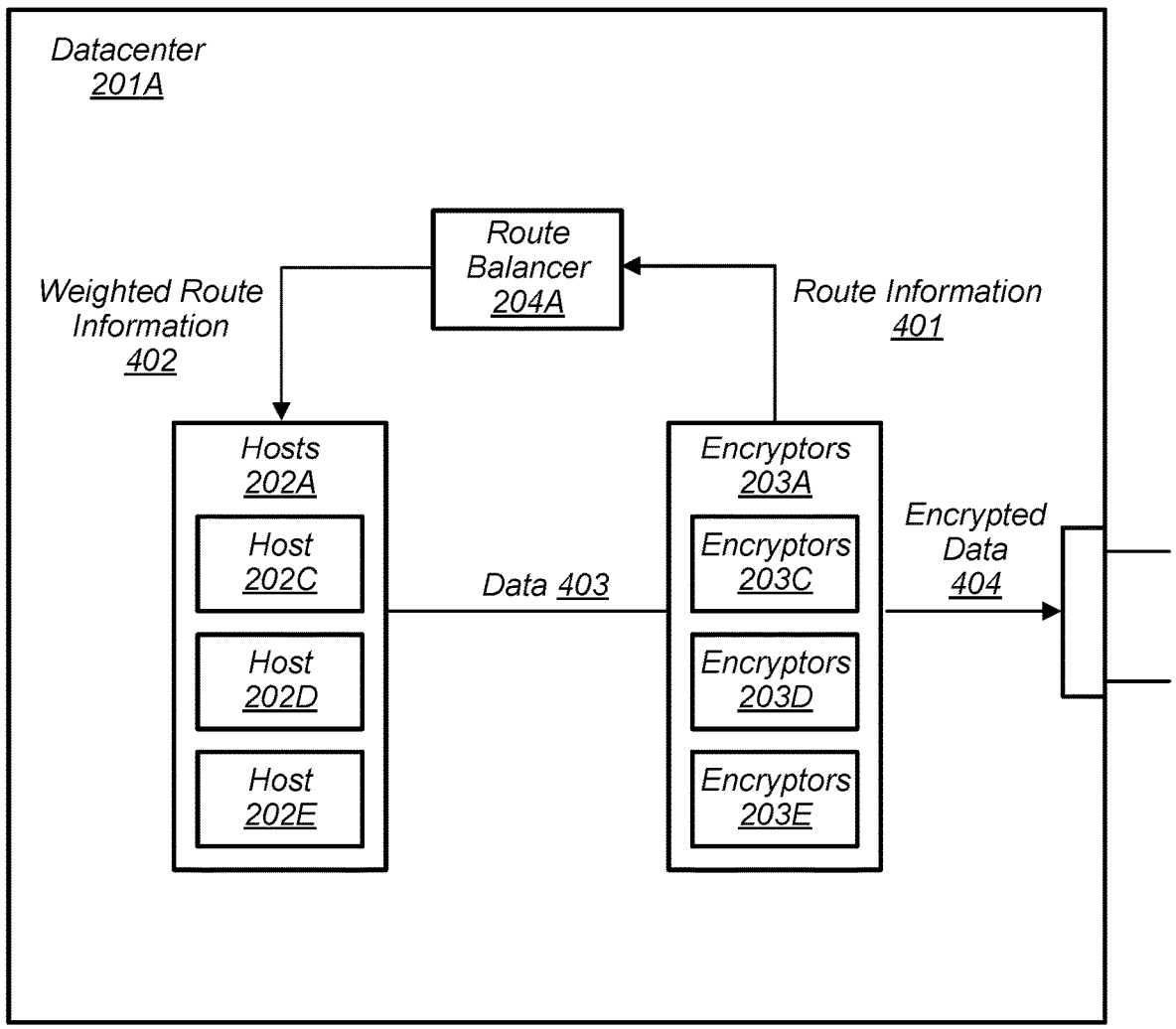
FIG. 4 is a block diagram illustrating an example route balancer, according to some embodiments.

Turning now to FIG. 4, a block diagram of an example route-balancing system 400 is shown, according to some embodiments. As shown in FIG. 4, route-balancing system 400 may be implemented, for example, at datacenter 201A of FIG. 2.

In various embodiments, route balancer 204A may be configured to monitor the performance of encryptors 203A and provide information corresponding to the performance of the encryptors 203A to hosts 202A. In some embodiments, for example, each of encryptors 203A may be configured to monitor and collect information relating to its own performance. Encryptors 203A may further be configured to provide that information, e.g., route information 401, to route balancer 204A. In various embodiments, route information 401 may include various items of information that may be used by hosts 202A to select an encryptor 203A. In some embodiments, one or more of the various items of information may be used to indicate the relative performance or "health" of paths to transfer data, through encryptors 203A, to datacenter 201B. For example, in an embodiment in which BGP peer-to-peer connections are established between encryptors 203A-203B, one such item of information may include a multi-exit discriminator (MED) field of the BGP routing protocol. This described embodiment, however, is provided merely as a non-limiting example, and in other embodiments, a variety of other fields or attributes may be included in route information 401. In some embodiments, each encryptor 203C-203E of the plurality of encryptors 203A may send route information 401 to route balancer 204. Further, in some embodiments, each encryptor of encryptors 203A may transfer route information 401 that corresponds to itself and to all other encryptors of the plurality of encryptors 203A.

Route balancer 204A may be configured to monitor the performance of encryptors 203A using various techniques. For example, in some embodiments, each of encryptors 203A may be configured to monitor information relating to its own performance, such as the data-transfer rate (e.g., in packets per second) of its connection to an encryptor 203B at datacenter 201B. Encryptors 203A may then provide that performance information to route balancer 204A. For example, route balancer 204A may be configured to retrieve information from the encryptors 203A on a recurring basis, e.g., using a representational state transfer (RESTful) API request. In the described example, each of encryptors 203A may collect performance information (e.g., the data-transfer rate information) at certain time intervals (e.g., every 2 seconds). After collecting the performance information, the encryptors 203A may increment a counter, indicating that new performance information has been collected, and make that performance information available to the route balancer 204A, for example as a RESTful API endpoint. Route balancer 204A may then monitor the performance information by sending a RESTful API call to the encryptors 203A, which may in turn respond by sending the performance information to route balancer 204A.

Route balancer 204A may use the route information 401 from encryptors 203A to determine weighted route information 402, also referred to herein as ranking information. For example, in some embodiments, route balancer 204A may receive the route information 401 corresponding to the plurality of encryptors 203A, for example as a list of "routes" to the encryptors 203A. Route balancer 204A may then compare each of the routes, for example by comparing the various items of information, such as fields or attributes included in route information 401, to determine the weighted route information 402. In an embodiment in which BGP peer-to-peer connections are established, route balancer 204A may determine the weighted route information 402, for example, using a BGP Best Path Selection algorithm or any other suitable algorithm. For example, in some embodiments, route balancer 204A may determine that each of the encryptors 203A is performing at a similar level, e.g., within some specified level of performance. In response to this determination, route balancer 204A may determine weighted route information 402 such that each of the routes is weighted equally. For example, route balancer 204A may provide the service IP address with a same value in an attribute field (e.g., MED field) of each of the encryptors 203A to the hosts 202A. In such an embodiment, the hosts 202A may select encryptors 203A in such a way that the load is balanced between the encryptors 203A. If, however, route balancer 204A determines that one of the encryptors 203A (e.g., 203C) is performing at a lower level (e.g., below some specified level of performance) than the other encryptors 203A, route balancer 204A may weigh the route information for encryptor 203C differently than the route information for the other encryptors 203D-203E. For example, route balancer 204A may modify the value in an attribute field (e.g., MED field) for encryptor 203C to indicate that encryptor 203C should be given lower priority than other encryptors 203A. Route balancer 204A may then provide the weighted route information 402, including the service IP addresses and the MED field information of the encryptors 203A, to hosts 202A. In such an embodiment, the hosts 202A may select encryptors 203A in such a way that more data is transferred via encryptors 203D-203E relative to encryptor 203C.

Route balancer 204A may provide weighted route information 402 to hosts 202A, which may then use the weighted route information 402 in selecting an encryptor 203A to transfer data to datacenter 201B. For example, in some embodiments, hosts 202A may be configured to receive the weighted route information 402 and select, e.g., using a software module accessible to hosts 202A, an encryptor 203A. In one embodiment, hosts 202A may include a software module, such as a BGP daemon software module, configured to use the weighted route information 402 to select an encryptor 203A to encrypt and transfer data to datacenter 201B. This process of monitoring the encryptors 203A and determining weighted route information 402 may, in some embodiments, be repeated at intervals such that the hosts 202A may select encryptors 203A based on more current performance or availability information.

For example, host 202D may select, based on weighted route information 402, encryptor 203E to encrypt data 403 to send to a host 202G at datacenter 201B. Host 202D may transfer the data 403 to encryptor 203E, which may encrypt the data 403 to generate encrypted data 404. Encryptor 203E may then transfer the encrypted data 404, over a secure communication connection via communication link 210, to a corresponding encryptor (e.g., encryptor 203H) at datacenter 201B. Upon receiving the encrypted data 404, encryptor 203H may decrypt the data and transfer it to host 202G.

Figure 5:
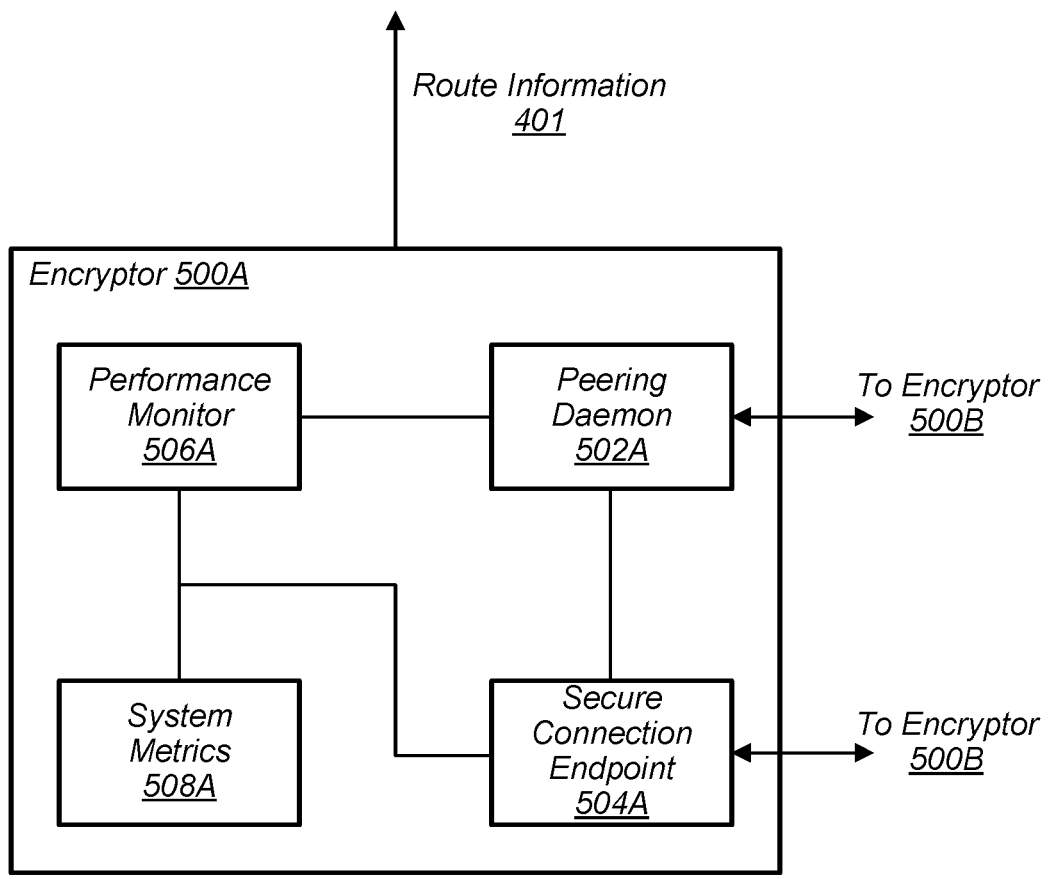
FIG. 5 is a block diagram illustrating an example encryptor, according to some embodiments.

Referring now to FIG. 5, a block diagram of an example encryptor 500A is shown, according to some embodiments. In various embodiments, encryptor 500A may be implemented as one or more of encryptors 203 of FIG. 2. For example, encryptor 500A may be implemented as one of encryptors 203A at datacenter 201A and be configured to received data from one or more hosts 202A, encrypt the data to generate encrypted data, and transfer the encrypted data, via a secure communication connection, to an encryptor 500B (not shown) at datacenter 201B.

As shown in FIG. 5, encryptor 500A may include peering daemon 502A, secure connection endpoint 504A, performance monitor 506A, and system metrics 508A. In various embodiments, encryptor 500A at datacenter 201A may be configured to establish a secure communication connection with encryptor 500B at datacenter 201B and transfer encrypted data, over the secure communication connection, to encryptor 500B. In some embodiments, encryptor 500A may establish the secure communication connection using peering daemon 502A and/or secure connection endpoint 504A. For example, peering daemon 502A may be configured to establish a peer-to-peer connection between encryptor 500A and encryptor 500B, according to some embodiments. Peering daemon 502A may establish the peer-to-peer connection using a variety of techniques. For example, in some embodiments, peering daemon 502A may establish a BGP peer-to-peer connection between encryptor 500A and encryptor 500B.

Further, in some embodiments, secure connection endpoint 504A may be configured to establish a secure communication connection over the peer-to-peer connection created by peering daemon 502A. For example, secure connection endpoint 504A may establish a secure tunnel between encryptor 500A and 500B. As noted above, in some embodiments, each of the encryptors 203 may share one or more cryptographic keys, which may be used in establishing the secure communication connection. The cryptographic key may be used in establishing a secure tunnel between encryptor 500A and 500B, for example as part of a key exchange phase of establishing the secure tunnel. In one embodiment, the secure tunnel may be an IPsec tunnel between encryptors 500A and 500B, and the one or more shared cryptographic keys may be used as part of an Internet Key Exchange (IKE) phase of establishing the IPsec tunnel. Note, however, that this is merely provided as a non-limiting example and is not intended to limit the scope of the present disclosure. In some embodiments, secure connection endpoint 504A may be configured to monitor and flag errors that may occur in establishing and maintaining the secure communication connection. For example, in the event that there is a connectivity problem between encryptors 500A and 500B, secure connection endpoint 504A may be configured to detect this error and flag the error for correction. In some embodiments, secure connection endpoint 504A may include in route information 401 information specifying any errors it detects with the secure communication connection.

After establishing a secure communication connection with encryptor 500B, encryptor 500A may be configured to notify route balancer 204A that it is available to transfer data to datacenter 201B. For example, in some embodiments, peering daemon 502A may be configured to send route information 401 to route balancer 204A. Route information 401 may, in some embodiments, may specify an IP address for the encryptor 500A, for example as part of a BGP route.

Encryptor 500A may also include performance monitor 506A. In various embodiments, performance monitor 506A may be configured to monitor various performance metrics associated with encryptor 500A or its connection with encryptor 500B. For example, performance monitor 506A may be configured to monitor various performance metrics corresponding to the secured communication connection between encryptor 500A and encryptor 500B, such as, in some embodiments, the status of the peer-to-peer connection and/or the secure tunnel. In some embodiments, performance monitor 506A may ping encryptor 500B via the communication link 210 and determine whether peering daemon 502B and secure connection endpoint 504B of encryptor 500B (not shown) can be reached. In some embodiments, performance monitor 506A may be configured to ping encryptor 500B and collect such information periodically, e.g., every 5 seconds. Additionally, performance monitor 506A may be configured to monitor system metrics 508A. In some embodiments, system metrics 508A may include various performance metrics corresponding to encryptor 500A. For example, in some embodiments, system metrics 508A may include processor utilization, memory utilization, local process verification (e.g., determining whether peering daemon 502A and secure connection endpoint 504A are running on encryptor 500A), etc. Encryptor 500A may include various items of the performance information in route information 401, in various embodiments.

Encryptor 500A may be configured to adjust the route information 401 transferred to route balancer 204A based on the information collected by performance monitor 506A. For example, if the performance information collected by performance monitor 506A indicates that encryptor 500A is operating at a level below some particular threshold (e.g., processor utilization, data-transfer rate, etc.), peering daemon 502A may adjust the route information 401 to reflect that performance level. For example, peering daemon 502A may adjust one or more attributes in route information 401 (e.g., a MED field) to indicate that encryptor 500A should be given lower priority relative to other encryptors in the plurality of encryptors 203A. Additionally, peering daemon 502A may adjust the route information 401 to reflect improvements in a performance level of encryptor 500A, for example by adjusting one or more attributes in route information 401 to indicate that encryptor 500A should be given higher priority relative to other encryptors in the plurality of encryptors 203A.

In some embodiments, this adjustment to route information 401 may be performed after a given number of performance tests by performance monitor 506A. For example, if performance monitor 506A detects in three consecutive performance tests that encryptor 500A is operating below some particular threshold, peering daemon 502A may adjust the route information 401 to reflect that performance level. Further, in the event that performance monitor 506A detects that encryptor 500A is unable to transfer data to datacenter 201B above some particular threshold, peering daemon 502A may stop sending route information 401 to route balancer 204 altogether. In such an embodiment, route balancer 204 may not include in weighted route information 402 any route information (e.g., IP address) corresponding to encryptor 500A.

Example Methods

Figure 6:
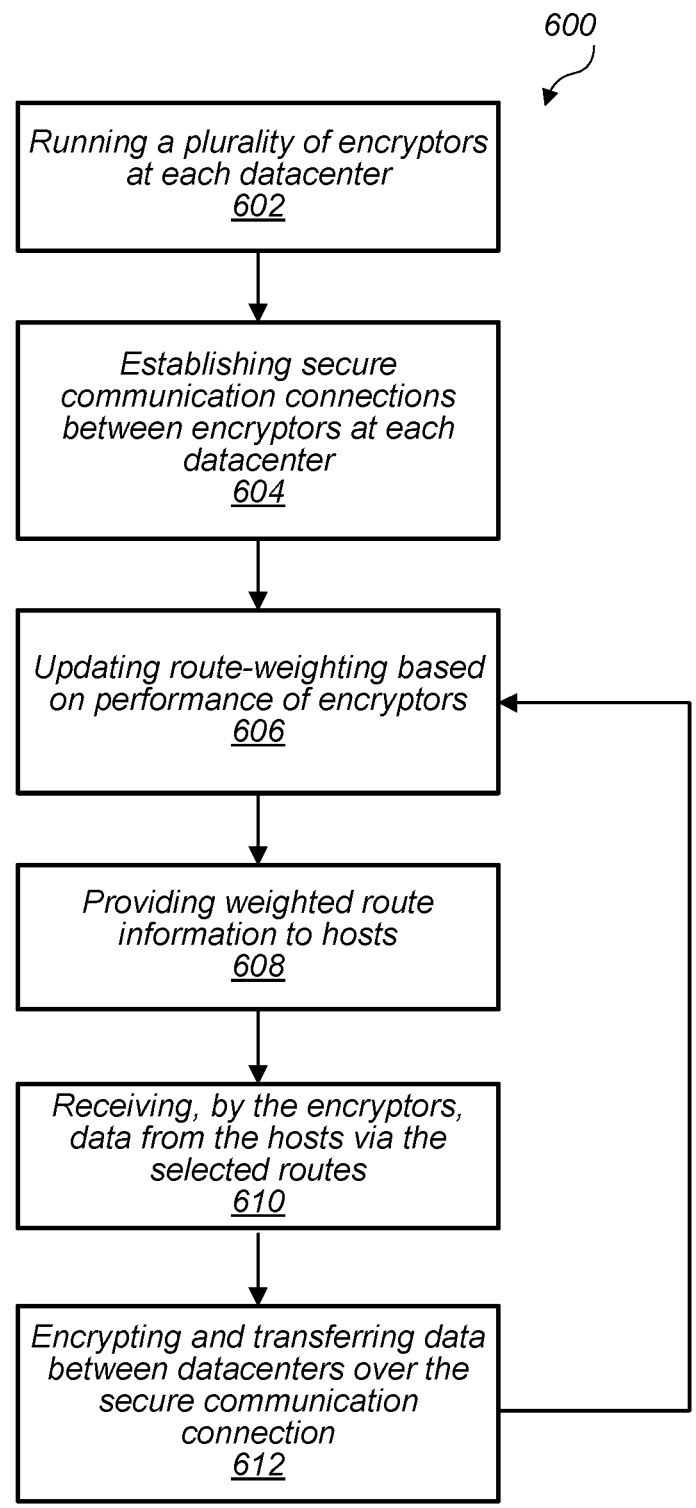
FIG. 6 is a flow diagram illustrating an example method for transferring encrypted data between datacenters, according to some embodiments.

Turning now to FIG. 6, a flow diagram is shown for an example method 600 for transferring data between datacenters, according to some embodiments. Although described in the context of transferring data between two datacenters, method 600 may be implemented to transfer data between any number of datacenters. In various embodiments, method 600 may be implemented, for example, at datacenters 201 of FIG. 2.

FIG. 6 includes steps 602-612. Step 602 includes running a plurality of encryptors at each datacenter, such as encryptors 203A and 203B at datacenters 201A and 201B, respectively. Step 604 includes establishing secure communication connections between encryptors at each datacenter. For example, encryptors 203A and 203B may establish a plurality of secure communication connections over communication link 210. Step 606 includes updating route-weighting based on performance of encryptors. As discussed in more detail above with reference to FIG. 4, route balancers 204 may monitor encryptors 203 and provide weighted route information 402 to hosts 202.

Step 608 includes providing the weighted route information to the host programs. For example, route balancer 204A may provide the weighted route information 402 to hosts 202A. In various embodiments, the weighted route information 402 may include various fields or attributes corresponding to encryptors 203A that may be used by hosts 202A to select an encryptor 203A. Step 610 includes receiving, by the encryptor, data from the hosts via the selected routes. For example, host 202C may receive the weighted route information 402 and, using that information, may select encryptor 203C as the route to transfer data 403 from datacenter 201A to 201B.

Step 612 includes encrypting and transferring data between datacenters over the secure communication connections. For example, encryptor 203C may encrypt the data 403 to generate encrypted data 404 and transfer the encrypted data 404 over communication link 210 to datacenter 201B. As shown in FIG. 6, steps 606-612 may be repeated in some embodiments, which may allow hosts 202A to select encryptors 203A based on updated weighted route information 402.

Figure 7:
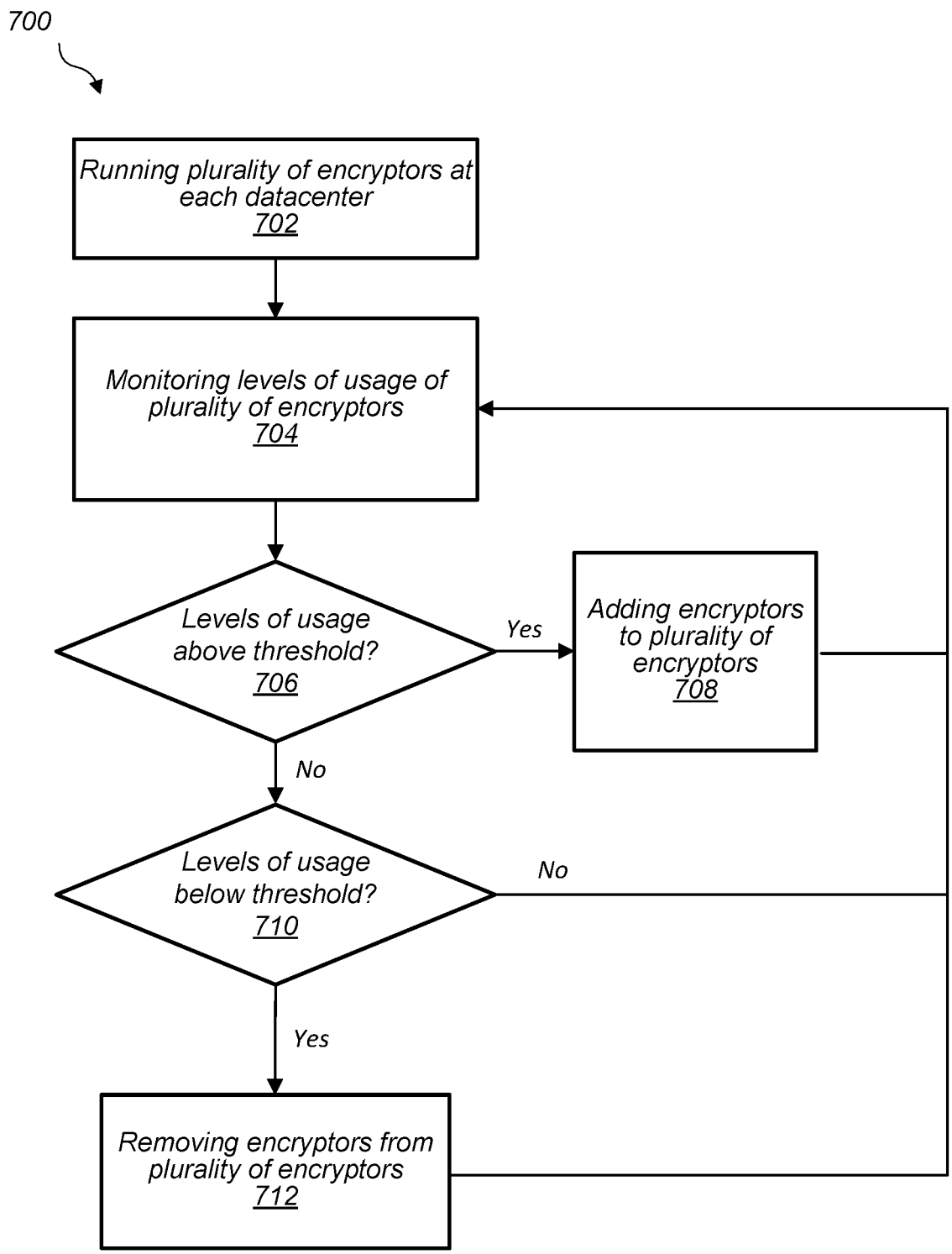
FIG. 7 is a flow diagram illustrating an example method for adjusting a number of encryptors at a datacenter, according to some embodiments.

Referring now to FIG. 7, a flow diagram is shown of an example method 700 for adjusting a number of encryptors running at one or more datacenters, according to some embodiments. In various embodiments, method 700 may be implemented, for example, as part of orchestration system 300 of FIG. 3.

FIG. 7 includes steps 702-712. Step 702 includes running a plurality of encryptors at each datacenter, such as encryptors 202 at datacenters 201. For example, step 702 may include orchestrator 206 transferring control information 301 to initiate operation of a plurality of encryptors 202 at each datacenter 201.

Method 700 then proceeds to step 704, which includes monitoring one or more levels of usage of the plurality of encryptors at the datacenters. The one or more levels of usage may correspond to a variety of considerations associated with utilizing the plurality of encryptors. For example, route balancers 204 may be configured to monitor one or more levels of usage, such as processor utilization, memory utilization, data-transfer rate, etc., of encryptors 203. In some embodiments, route balancers 204 may monitor the one or more levels of usage by receiving usage information collected by encryptors 203 and transferred to route balancer 204.

Method 700 then proceeds to step 706. Step 706 includes determining whether one or more of the levels of usage is above a particular threshold. For example, in one embodiment, route balancer 204 may compare the levels of usage, such as the monitored processor utilization or data-transfer rate, against a particular threshold value for processor utilization and/or data-transfer rate. If the one or more of the levels of usage do exceed a particular threshold, this may indicate, for example, that the encryptors 203 are processing a relatively large amount of data. In some embodiments, it may be desirable to adjust the amount of data processed by each of the encryptors 203, for example to provide adequate capacity in the event of a sudden increase in the demand of encryptors 203. Thus, if one or more of the levels of usage exceeds a particular threshold (e.g., if the processor utilization or memory utilization exceeds 45% of available capacity), it may be desirable in some embodiments to increase the number of encryptors 203 running at the datacenters 201. This may, in various embodiments, allow the data-processing to be distributed across a greater number of encryptors 203, reducing the amount of data processed by a given encryptor 203.

If, in step 706, the one or more levels of usage exceed a particular threshold, method 700 continues to step 708. Step 708 includes adding encryptors to the plurality of encryptors. For example, route balancer 204 may send a request to orchestrator 206 to initiate operation of additional encryptors 203 at datacenters 201. Based on this request, orchestrator 206 may send control information 301 to datacenters 201, for example as an API call, requesting additional encryptors 203 be instantiated.

If, however, the one or more levels of usage do not exceed a particular threshold in step 706, method 700 then proceeds to step 710. Step 710 includes determining whether the one or more levels of usage are below a particular threshold. For example, in some embodiments, the one or more levels of usage may correspond to processor utilization or data-transfer rate. In such embodiments, it may be desirable for the processor utilization or data-transfer rate for encryptors 203 to exceed a particular threshold in order, for example, to limit the number of encryptors 203 running at datacenters 201 and thus conserve computational resources. Therefore, if one or more of the levels of usage is below a particular threshold, it may be desirable in some embodiments to decrease the number of encryptors 203 running at the datacenters 201 in order to, for example, preserve computational resources.

If, in step 710, the one or more levels of usage are below a particular threshold, method 700 proceeds to step 712. Step 712 includes removing encryptors from the plurality of encryptors. For example, route balancer 204 may send a request to orchestrator 206 to remove one or more encryptors 203 from operation. Based on this request, orchestrator 206 may send control information 301 to datacenters 201, for example as an API call, requesting that one or more of the plurality of encryptors 203 be removed from operation.

As depicted in FIG. 7, steps 704-712 may, in some embodiments, be repeated at periodic or non-periodic intervals. In this way, performance of method 700 may enable a datacenter to dynamically scale the number of encryptors 203 running at a given time based on levels of usage or demand. In various embodiments, method 700 may allow datacenters 201 to both respond to varying levels of demand for encryptors 203 and preserve computational resources by removing under-utilized encryptors 203 from operation.

Note that although steps 702-712 are shown in the order depicted in FIG. 7, other orders are also contemplated. For example, in some embodiments, step 710 may be performed before or concurrently with step 706. Further, although steps 706 and 710 describe comparing levels of usage to a threshold, one of ordinary skill in the art with the benefit of this disclosure will recognize that the described determinations may include any suitable number of threshold values. For example, in some embodiments, a plurality of levels of usage are compared to a corresponding plurality of threshold values at steps 706 and 710. Additionally, in some embodiments, the one or more levels of usage or the one or more thresholds may be weighted in any suitable manner to determine whether encryptors 203 should be added or removed from operation at datacenters 201.

Figure 8:
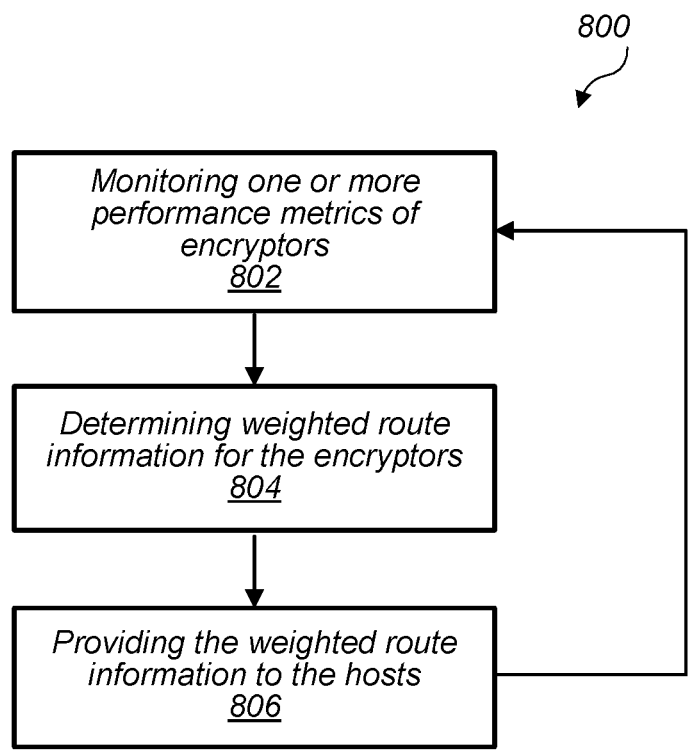
FIG. 8 is a flow diagram illustrating an example method for providing weighted route information to hosts, according to some embodiments.

Turning now to FIG. 8, a flow diagram is shown of an example method 800 for providing weighted route information to a plurality of hosts, according to some embodiments. In various embodiments, method 800 may be implemented, for example, as part of route-balancing system 400 of FIG. 4. FIG. 8 includes steps 802-806. Step 802 includes monitoring one or more performance metrics of a plurality of encryptors. For example, step 802 may include receiving, by route balancer 204A, route information 401 from encryptors 203A. In various embodiments, each of encryptors 203 may be configured to monitor and collect information relating to its own performance and send that information as route information 401. In some embodiments, route information may include various items of information indicative of, for example, the status of the secure communication connections through encryptors 203 to transfer data to datacenter 201B.

Method 800 then proceeds to step 804, which includes determining weighted route information for the encryptors. For example, route balancers 204A may use route information 401 to determine weighted route information 402. In some embodiments, determining the weighted route information may include comparing the routes to various encryptors 203 and determining a ranking of the encryptors 203, which may indicate, for example, a level of availability or performance of the individual encryptors in the plurality of encryptors 203.

Method 800 then proceeds to step 806, which includes providing the weighted route information to the plurality of hosts. For example, route balancer 204A may provide the weighted route information 402 to hosts 202A. Hosts 202A may use this weighted route information 402 to select an encryptor 203A to transfer data to datacenter 201B. As shown in FIG. 8, steps 802-806 may, in some embodiments, be repeated, allowing hosts 202A to select encryptors 203A based on updated performance or availability information.

Figure 9A:
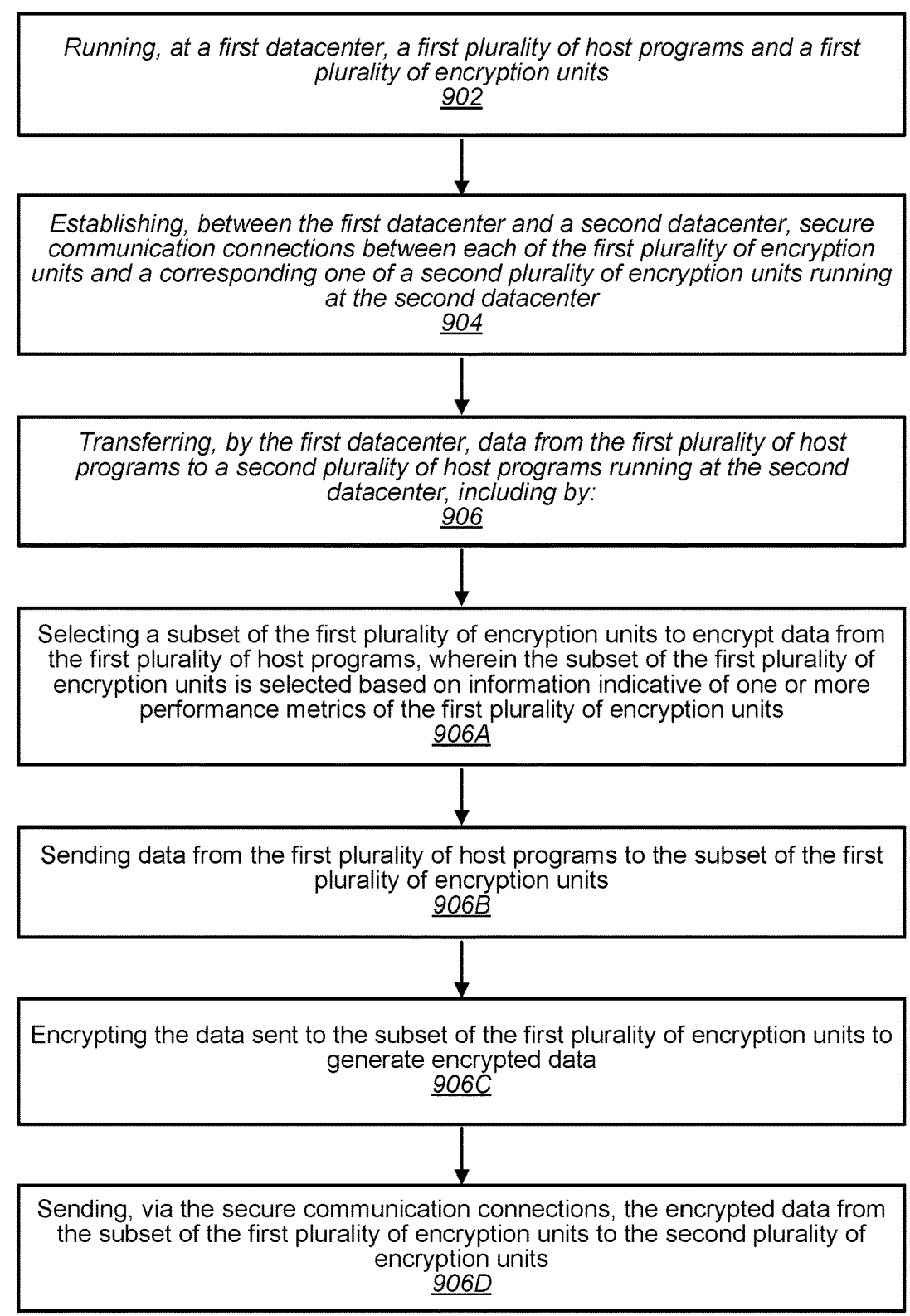
FIG. 9A is a flow diagram illustrating an example method for transferring encrypted data between datacenters, according to some embodiments.

Referring now to FIG. 9A, a flow diagram is shown for an example method 900 for transferring data between datacenters, according to some embodiments. In various embodiments, method 900 may be implemented, for example, at datacenters 201 of FIG. 2. FIG. 9A includes steps 902-906D. Step 902 includes running, at a first datacenter, a first plurality of host programs and a first plurality of encryption units. In some embodiments, for example, a first datacenter may include datacenter 201A, a first plurality of host programs may include one or more of hosts 202C-202E, and a first plurality of encryption units may include one or more of encryptors 203C-202E.

Method 900 then proceeds to step 904, which includes establishing, between the first datacenter and a second datacenter, secure communication connections between each of the first plurality of encryption units and a corresponding one of a second plurality of encryption units running at the second datacenter. In some embodiments, encryptors 203A at datacenter 201A may establish secure communication connections with encryptors 203B at datacenter 201B via communication link 210 of FIG. 2.

Method 900 then proceeds to step 906, which includes transferring, by the first datacenter, data from the first plurality of host programs to a second plurality of host programs running at the second datacenter. Method 900 then proceeds to steps 906A-906D, which may further describe steps for transferring the data, according to some embodiments.

Step 906A includes selecting a subset of the first plurality of encryption units to encrypt data from the first plurality of host programs. In some embodiments, the subset of the first plurality of encryption units is selected based on information indicative of one or more performance metrics of the first plurality of encryption units. For example, in some embodiments, hosts 202 may select encryptors 203 to encrypt data based on information indicative of one or more performance metrics of the encryptors 203 provided by route balancer 204. Step 906B includes transferring data from the first plurality of host programs to the subset of the first plurality of encryption units. For example, hosts 202A may transfer data to encryptors 203A in FIG. 2, in some embodiments.

Step 906C includes encrypting the data transferred to the subset of the first plurality of encryption units to generate encrypted data. In various embodiments, the encryption units may encrypt the data according to a variety of cryptographic techniques. In one embodiment, for example, the encryption units may implement one or more cryptographic ciphers, such as the Advanced Encryption Standard (AES) cipher, or any other suitable technique. Step 906D includes sending, via the secured communication connections, the encrypted data from the subset of the first plurality of encryption units to the second plurality of encryption units. For example, in the embodiment depicted in FIG. 2, encryptors 203A at datacenter 201A may send the encrypted data, via secure communication connections over communication link 210, to encryptors 203B at datacenter 201B.

Turning now to FIG. 9B, a flow diagram is shown for an additional example method 950 for transferring data between datacenters, according to some embodiments. In various embodiments, method 950 may be implemented, for example, at datacenters 201 of FIG. 2. FIG. 9B includes steps 952-956C. Step 952 includes establishing secure communication connections between each of a first plurality of encryption units at a first datacenter and a corresponding one of a second plurality of encryption units at a second datacenter. In some embodiments, for example, a first datacenter may include datacenter 201A, a first plurality of encryption units may include one or more of encryptors 203C-203E, and a second plurality of encryption units at a second datacenter may include one or more of encryptors 203F-203H at datacenter 201B of FIG. 2. In some embodiments, encryptors 203A at datacenter 201A may establish secure communication connections with encryptors 203B at datacenter 201B via communication link 210 of FIG. 2.

Method 950 then proceeds to step 954, which includes providing, to a first plurality of host programs at the first datacenter, information indicative of one or more performance metrics of the first plurality of encryption units. For example, in some embodiments, route balancer 204A may provide information indicative of one or more performance metrics of encryptors 203C-203E to hosts 202C-202E.

Method 950 then proceeds to step 956, which includes transferring data from a first host program of the first plurality of host programs to a second host program of a second plurality of host programs at the second datacenter. For example, step 956 may include transferring data from host 202C to host 202G at datacenter 201B. Method 950 then proceeds to steps 956A-956C, which may further describe steps for transferring the data, according to some embodiments.

Step 956A includes receiving, at a first encryption unit of the first plurality of encryption units, data from the first host program. In some embodiments, the receiving is in response to the first host program selecting the first encryption unit to encrypt the data based on the information indicative of one or more performance metrics of the first encryption unit. For example, in some embodiments, hosts 202 may select encryptors 203 to encrypt data based on information indicative of one or more performance metrics of the encryptors 203 provided by route balancer 204. Step 956B includes encrypting, by the first encryption unit, the data to generate encrypted data. As noted above, the encryption units may encrypt the data according to a variety of cryptographic techniques, such the AES cipher, or any other suitable technique. Step 956C includes transferring, via a first secure communication connection of the secure communication connections, the encrypted data to a corresponding second encryption unit at the second datacenter. For example, in the embodiment depicted in FIG. 2, encryptors 203A at datacenter 201A may send the encrypted data, via secure communication connections over communication link 210, to encryptors 203B at datacenter 201B.

Example Computer System

Figure 10:
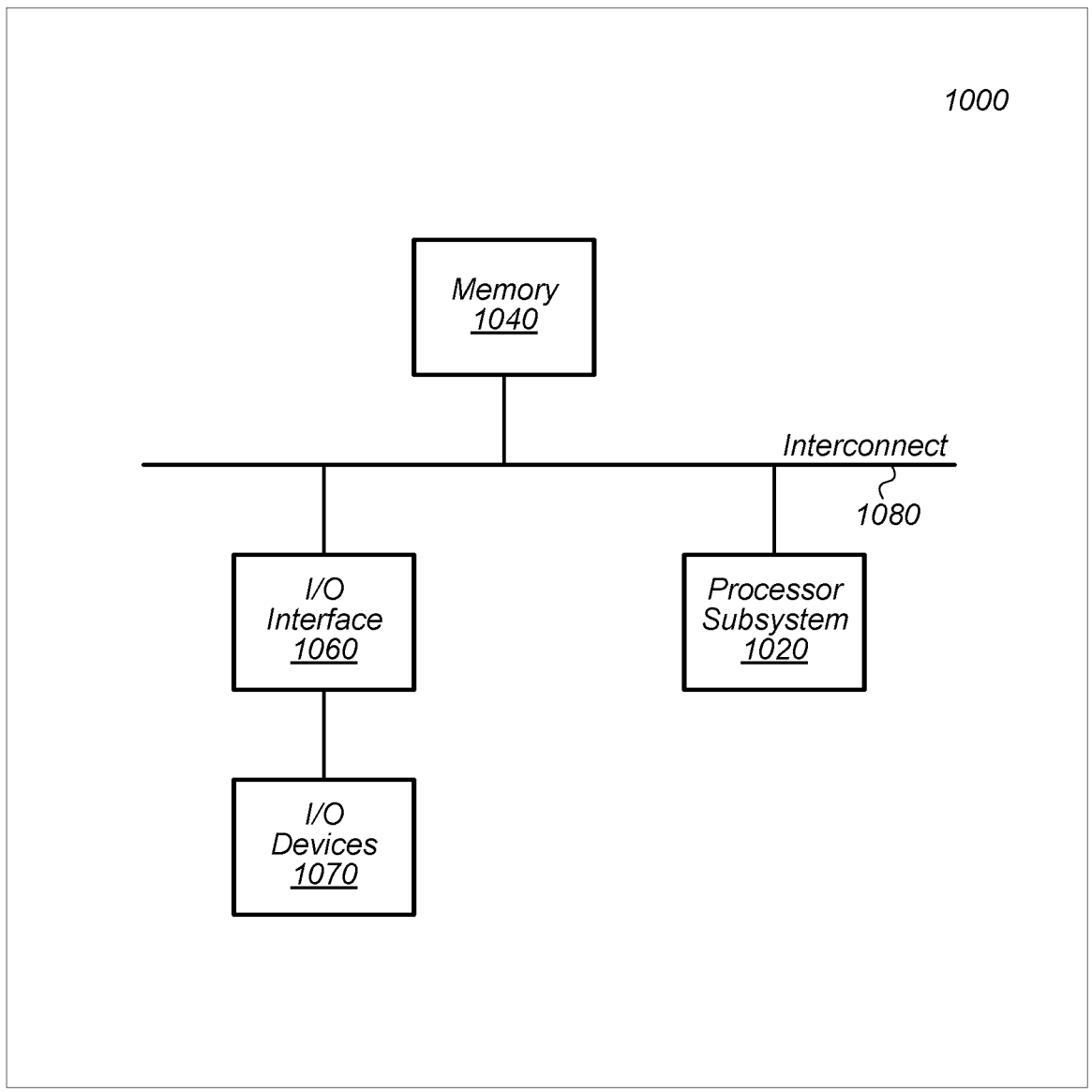
FIG. 10 is a block diagram illustrating an example computer system, according to some embodiments.

Referring now to FIG. 10, a block diagram is depicted of an example computer system 1000, which may implement one or more computer systems, such as computer systems 102 of FIG. 1. Computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1020 may include one or more processors or processing units. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable to store program instructions executable by processor subsystem 1020 to cause system 1000 perform various operations described herein. System memory 1040 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1040. Rather, computer system 1000 may also include other forms of storage such as cache memory in processor subsystem 1020 and secondary storage on I/O Devices 1070 (e.g., a hard drive, storage array, etc.). In some embodiments, these other forms of storage may also store program instructions executable by processor subsystem 1020.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1070 (e.g., configured to communicate over WiFi, Bluetooth, Ethernet, etc.).

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "encryption unit configured to generate encrypted data" is intended to cover, for example, a device that performs this function during operation, even if the device in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile device, for example, would not be considered to be "configured to" perform some specific function, although it may be "configurable to" perform that function. After appropriate programming, the mobile device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    monitoring one or more performance metrics of a first encryption unit executing at a first datacenter;
    transferring data from a first host program executing at the first data center to a second host program executing at a second data center, including by:
        receiving, by the first host program, information indicative of the one or more performance metrics of the first encryption unit;
        selecting, by the first host program, the first encryption unit, from a plurality of encryption units, to encrypt data from the first host program, wherein the first encryption unit is selected based on the information indicative of the one or more performance metrics;
        encrypting, by the first encryption unit, data from the first host program to generate encrypted data; and
        sending the encrypted data from the first encryption unit to a corresponding encryption unit executing at the second datacenter;
    monitoring one or more levels of usage of the plurality of encryption units; and
    modifying a number of encryption units executing at the first datacenter based on the one or more levels of usage, including by sending a request to an orchestration host to instantiate additional encryption units at the first datacenter and the second datacenter.

2. The method of claim 1, wherein the one or more levels of usage includes at least one of the following:
    a processor utilization of one or more of the plurality of encryption units;
    a data-transfer rate of one or more of the plurality of encryption units; and
    a Bidirectional Forwarding Detection (BFD) link status.

3. The method of claim 1, wherein the orchestration host is executing at the first datacenter.

4. The method of claim 1, further comprising:
    periodically refreshing the plurality of encryption units executing at the first datacenter, including by:
        decommissioning at least one of the plurality of encryption units after a particular time interval such that the at least one encryption unit is no longer available for use in transferring encrypted data to the second data center; and
        instantiating a new encryption unit at the first datacenter.

5. The method of claim 1, wherein the one or more performance metrics include, for a given encryption unit of the plurality of encryption units, at least one of a processor utilization, a data transmission speed, and a status of a secure communication connection.

6. The method of claim 1, further comprising:
    determining, based on the one or more performance metrics, ranking information corresponding to the plurality of encryption units; and
    providing the information indicative of the one or more performance metrics of the plurality of encryption units to the first host program, wherein the information indicative of the one or more performance metrics includes the ranking information.

7. The method of claim 1, further comprising:
    determining that a performance level of a particular encryption unit of the plurality of encryption units is below a performance threshold; and
    in response to the determining, sending a request to an orchestration host to remove the particular encryption unit from the plurality of encryption units.

8. A non-transitory, computer-readable medium having computer instructions stored thereon that are capable of being executed by one or more computer systems to cause operations comprising:
    monitoring one or more performance metrics of a first encryption unit executing at a first datacenter;
    transferring data from a first host program executing at the first data center to a second host program executing at a second data center, including by:
        receiving, by the first host program, information indicative of the one or more performance metrics of the first encryption unit;
        selecting, by the first host program, the first encryption unit, from a plurality of encryption units, to encrypt data from the first host program, wherein the first encryption unit is selected based on the information indicative of the one or more performance metrics;
        encrypting, by the first encryption unit, data from the first host program to generate encrypted data; and
        sending the encrypted data from the first encryption unit to a corresponding encryption unit executing at the second datacenter;
    monitoring one or more levels of usage of the plurality of encryption units; and
    modifying a number of encryption units executing at the first datacenter based on the one or more levels of usage, including by sending a request to an orchestration host to instantiate additional encryption units at the first datacenter and the second datacenter.

9. The non-transitory, computer-readable medium of claim 8, wherein the operations further comprise:
    determining that at least one of the one or more performance metrics of a particular encryption unit, of the plurality of encryption units, is below a particular threshold;
    in response to the determining, adjusting information indicative of the at least one performance metric of the particular encryption unit; and
    providing the information indicative of the at least one performance metric of the particular encryption unit to the first host program.

10. The non-transitory, computer-readable medium of claim 8, wherein each of the plurality of encryption units share a cryptographic key; and wherein the encrypting comprises establishing a secure tunnel, using the cryptographic key, over a peer-to-peer connection between the first encryption unit and the corresponding encryption unit at the second datacenter.

11. The non-transitory, computer-readable medium of claim 8, wherein the encrypting includes using a parallel packet-processing algorithm to encrypt the data from the first host program.

12. A system, comprising:
    a datacenter facility that includes:
        a plurality of computer systems;
        a plurality of storage subsystems that are configured to store data for a plurality of entities; and
        a network interface configured to communicate with a different datacenter facility;
    wherein at least one of the plurality of computer systems includes a non-transitory, computer-readable medium having program instructions stored thereon that are capable of being executed by one or more of the plurality of computer systems to perform operations, comprising:
        monitoring one or more performance metrics of a first encryption unit executing at the datacenter facility;
        transferring data from a first host program executing at the datacenterfacilityto a second host program executing at the different datacenter facility, including by:
            receiving, by the first host program, information indicative of the one or more performance metrics of the first encryption unit;
            selecting, by the first host program, the first encryption unit, from a plurality of encryption units, to encrypt data from the first host program, wherein the first encryption unit is selected based on the information indicative of the one or more performance metrics;
            encrypting, by the first encryption unit, data from the first host program to generate encrypted data; and
            sending the encrypted data from the first encryption unit to a corresponding encryption unit executing at the different datacenter facility;
        monitoring one or more levels of usage of the plurality of encryption units; and
        modifying a number of encryption units executing at the datacenter facility based on the one or more levels of usage, including by sending a request to an orchestration host to instantiate additional encryption units at the data center facility.

13. The system of claim 12, wherein at least one of the plurality of encryption units is a virtual machine executing on one or more of the plurality of computer systems.

14. The system of claim 12, wherein the operations further comprise:
    establishing a secure communication connection between the first encryption unit and the corresponding encryption unit executing at the different datacenter facility, wherein the secure communication connection is an IPsec tunnel created over a BGP peer-to-peer connection between the first encryption unit and the corresponding encryption unit.

\* \* \* \* \*